(12) United States Patent
Haglund

(10) Patent No.: US 6,631,930 B2
(45) Date of Patent: Oct. 14, 2003

(54) LOCK COMPONENT

(75) Inventor: Lennart Haglund, Vårgårda (SE)

(73) Assignee: Autoliv Development, Vargarda (SE)

( * ) Notice: Subject to any disclaimer, the term of this patent is extended or adjusted under 35 U.S.C. 154(b) by 0 days.

(21) Appl. No.: 09/866,915

(22) Filed: May 30, 2001

(65) Prior Publication Data

US 2002/0003349 A1 Jan. 10, 2002

(30) Foreign Application Priority Data

May 30, 2000 (GB) .............................................. 0013118

(51) Int. Cl.[7] .............................. E05C 19/00; E05C 1/12
(52) U.S. Cl. ........................... 292/1; 292/153; 292/165; 292/167; 292/169.12; 292/216; 292/300; 292/DIG. 23; 292/DIG. 42; 292/DIG. 53
(58) Field of Search ................... 292/DIG. 23, DIG. 53, 292/DIG. 42, 300, 1, 216, 167, 340, 341, 341.12, 153, 165, 169.12

(56) References Cited

U.S. PATENT DOCUMENTS

| | | | | |
|---|---|---|---|---|
| 1,022,576 A | * | 4/1912 | Beehler ...................... 292/121 |
| 1,635,757 A | * | 7/1927 | Ledwinka .............. 292/169.11 |
| 1,760,491 A | * | 5/1930 | Grund et al. ................ 292/139 |
| 1,991,120 A | * | 2/1935 | Rightmyer .................. 292/167 |
| 2,007,672 A | * | 7/1935 | Benzee ....................... 292/164 |
| 2,010,702 A | * | 8/1935 | Rightmyer .................. 292/167 |
| 2,123,303 A | * | 7/1938 | Haberstump ................ 292/167 |
| 2,146,142 A | * | 2/1939 | Heasley ........................ 292/57 |
| 2,156,874 A | * | 5/1939 | Schnitzer .................... 292/216 |
| 2,211,130 A | * | 8/1940 | Knapp ........................ 292/167 |
| 2,246,784 A | * | 6/1941 | Dall ............................. 70/153 |
| 2,276,019 A | * | 3/1942 | Ching ......................... 292/150 |
| 2,435,987 A | * | 2/1948 | Tierney et al. ................ 70/153 |
| 2,703,727 A | * | 3/1955 | Vigmostad .................. 292/121 |
| 2,832,624 A | * | 4/1958 | Thorne .................... 292/169.12 |
| 4,056,276 A | * | 11/1977 | Jarvis ......................... 292/201 |
| 4,195,881 A | * | 4/1980 | Klüting et al. .............. 297/216 |
| 4,660,871 A | * | 4/1987 | Arakawa et al. ............. 292/81 |
| 4,662,195 A | * | 5/1987 | von Buelow et al. ......... 70/139 |
| 4,744,392 A | * | 5/1988 | Tade et al. .................... 138/89 |
| 4,765,682 A | * | 8/1988 | Satoh ......................... 297/379 |
| 4,869,541 A | * | 9/1989 | Wainwright ............... 296/65.1 |
| 4,921,286 A | * | 5/1990 | Nakamura .................. 292/216 |
| 5,015,026 A | * | 5/1991 | Mouri ....................... 296/65.1 |
| 5,152,558 A | * | 10/1992 | Smith et al. ................. 292/1.5 |

(List continued on next page.)

FOREIGN PATENT DOCUMENTS

| | | | | |
|---|---|---|---|---|
| DE | 2843588 | * | 4/1980 | ................. 292/338 |
| GB | 256174 | * | 12/1926 | ................. 292/167 |
| GB | 528131 | | 10/1940 | |
| GB | 2 220 977 | | 1/1990 | |
| GB | 2 253 435 | | 9/1992 | |
| SU | 412366 | * | 9/1974 | .......... 292/DIG. 23 |

Primary Examiner—Robert J. Sandy
Assistant Examiner—Carlos Lugo
(74) Attorney, Agent, or Firm—Venable LLP; Robert Kinberg

(57) ABSTRACT

A lock component comprises a mounting plate (50). An intermediate resilient element (56) is mounted on the plate and has a peg (59) engaging a recess (53) on the plate to prevent rotation of the intermediate element. The intermediate element presents a collar (60) and projection (61) having an outer periphery configured to snugly engage an aperture (64) in an arm (62) which carries a lockable element (68). A connecting element (74) has a shaft (76) passing through a central aperture in the intermediate element (56), thus also extending through the aperture (64) in the arm (62). The shaft is connected to an aperture (55) formed in the mounting plate (50). The lockable element (68) has at least one degree of freedom of movement, which may be a rotational movement about the axis of the connecting element (74), or which may be a lateral movement. When the lockable element (68) is engaged within the locking arrangement, the intermediate element (56) is deformed.

6 Claims, 4 Drawing Sheets

U.S. PATENT DOCUMENTS

| | | | | |
|---|---|---|---|---|
| 5,342,103 A | | 8/1994 | Tame et al. | |
| 5,398,995 A | * | 3/1995 | Hurite | 297/378.12 |
| 5,492,377 A | * | 2/1996 | Guelck | 292/2 |
| 5,564,295 A | * | 10/1996 | Weinerman et al. | 70/208 |
| 5,566,431 A | * | 10/1996 | Haglung | 24/663 |
| 5,588,705 A | * | 12/1996 | Chang | 297/367 |
| 5,884,948 A | * | 3/1999 | Weinerman et al. | 292/216 |
| 5,971,342 A | * | 10/1999 | Sakai et al. | 248/430 |
| 6,139,076 A | * | 10/2000 | Hara et al. | 292/336.3 |
| 6,164,720 A | * | 12/2000 | Haglung | 297/216.1 |
| 6,256,194 B1 | * | 7/2001 | Choi et al. | 361/683 |

* cited by examiner

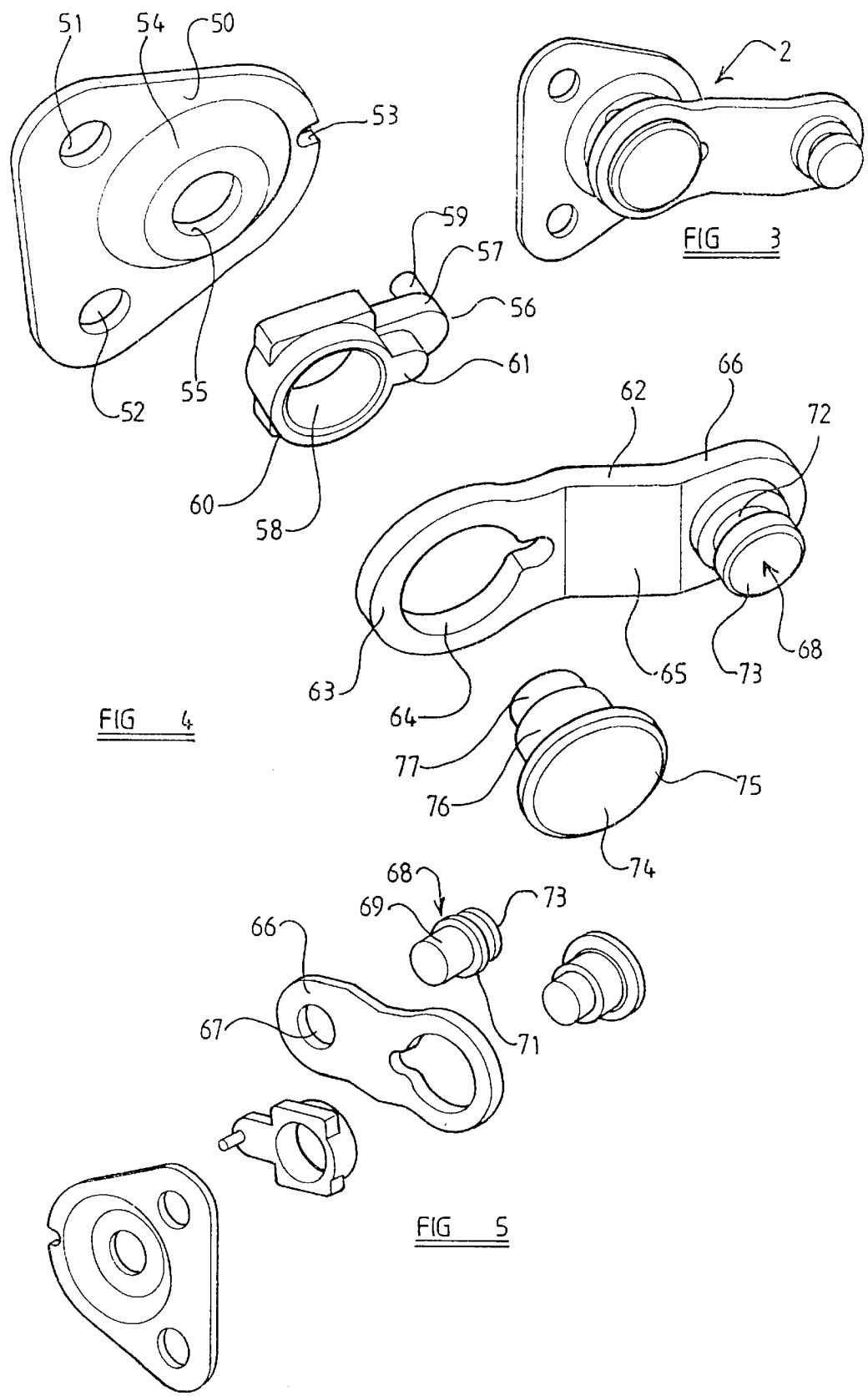

LOCK COMPONENT

BACKGROUND OF THE INVENTION

THE PRESENT INVENTION relates to a lock component, and more particularly relates to a lock component intended to co-operate with a locking mechanism. In particular, the present invention relates to a lock component adapted to co-operate with a locking mechanism suitable for use in locking a foldable back-rest of a vehicle seat, in particular a rear seat.

It is desirable to provide the rear seat of a vehicle, such as a passenger car, with a foldable back-rest, since this may facilitate the transportation of a long object or a bulky object within the vehicle. Typically a foldable back-rest is hinged, at the lower portion of the back-rest, to the squab of the seat or to the chassis of the vehicle. A lock is provided to lock the seat in the upright position, and the lock may consist of a locking mechanism secured to the chassis of the vehicle, which co-operates with a lock component which is mounted on the upper part of the back-rest. The lock has to be very strong to be able to withstand substantial forces that may be applied to the back-rest if loose luggage in the boot of the vehicle moves forward during a frontal impact. It is also especially important for the lock to be very strong if the upper anchorage points for the seat-belt system are located in the back-rest of the seat, and not directly mounted on the chassis.

However, it has been found that there is relative movement between the chassis of a motor vehicle, such as a car, and a foldable back-rest, when the vehicle is in motion. This relative movement may cause noise problems within the cabin of the motor vehicle, especially if the locking mechanism and the lock component are not properly connected to each other or have a relatively large clearance between them, permitting relative movement.

At the present time, to ensure that a foldable rear seat back-rest in a vehicle may be locked in position, the locking mechanism typically includes a lock that defines a slot or passage that is of a sufficient size to accept part of the locking component that is to co-operate with the lock, even if the locking mechanism and the lock component are not perfectly aligned. This means that there is typically a relatively wide clearance between the locking mechanism and the co-operating lock component.

SUMMARY OF THE INVENTION

The present invention seeks to provide an improved lock component.

According to this invention there is provided a lock component, comprising a mounting plate, a deformable element connected to the mounting plate and an arm connected to the deformable element so as to be connected to the mounting plate through the intermediary of the deformable element, the arm carrying a lockable element, the lockable element being adapted to co-operate with and be retained by a locking mechanism, the lockable element having at least one degree of freedom of movement.

Preferably the freedom of movement is a rotational freedom of movement.

Advantageously the freedom of movement comprises two freedoms of movement, one being rotational and one being a lateral displacement.

Preferably the arm presents an aperture having a predetermined configuration, the aperture being dimensioned to receive a portion of the deformable element which has substantially the same configuration.

Advantageously the intermediate element is provided with a bore therethrough, the bore being located to be co-aligned with the aperture in the arm when the arm is mounted on the intermediate element, connecting means being provided extending through the aperture in the arm through the intermediate element and extending to the mounting plate.

Conveniently the lockable element comprises an element protruding from said arm presenting a first flange, a relatively narrow, cylindrical portion and an enlarged diameter head.

Advantageously said flange is chamfered, the narrow cylindrical portion is barrel-shaped and the enlarged diameter head has a substantially domed outward end.

Preferably the arm is cranked.

Conveniently the deformable element is resiliently deformable, such as a resiliently deformable polymer material.

The invention also relates to a component as described above in combination with a locking mechanism, the locking mechanism defining a slot to receive the lockable element, the relative position between the slot and the said component being such that when the lockable element is inserted into the slot, the intermediate element is distorted.

Preferably the locking mechanism comprises a front plate defining said slot and a rotatable lock plate defining a recess adapted to receive part of the said lockable element, the lock plate being movable to a position in which the lockable element is retained within the slot.

The lock component and locking mechanism may be mounted in the motor vehicle to retain a foldable back-rest of a vehicle seat in an elevated position.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 3 is a front view of the lock component, FIG. 4 is a partially exploded view corresponding to FIG. 3, FIG. 5 is an exploded view of the lock component shown from the rear.

DETAILED DESCRIPTION OF THE INVENTION

Figure 1:
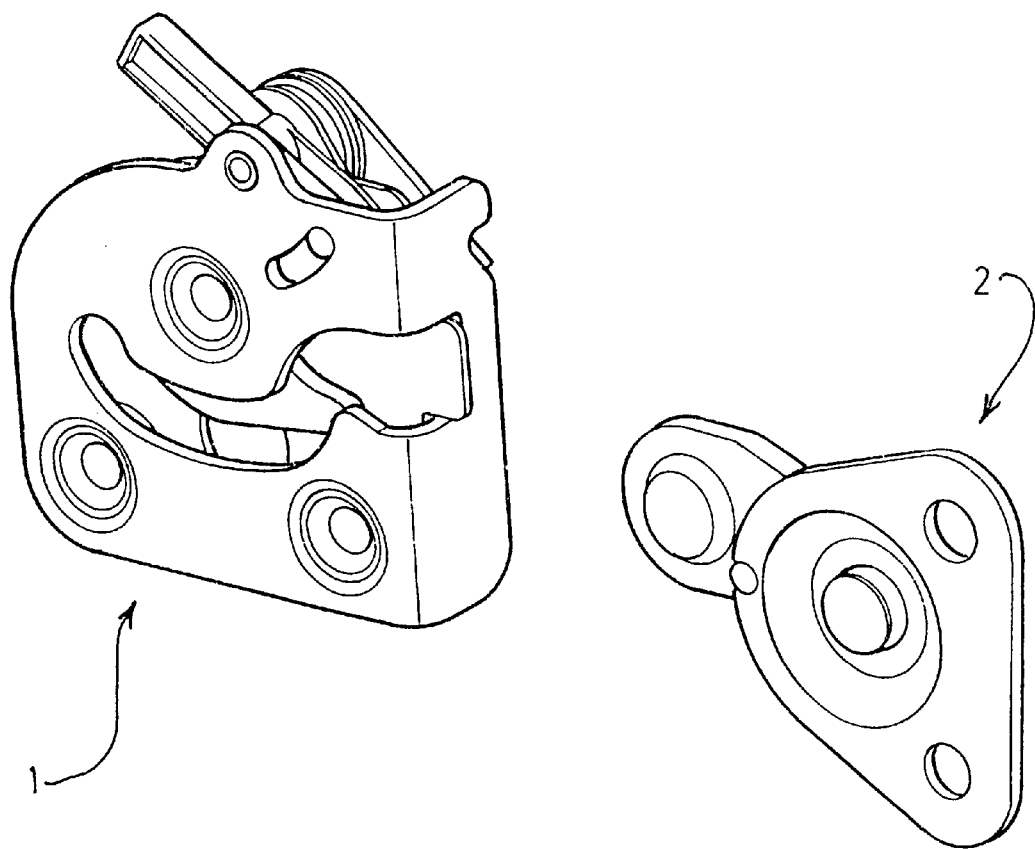
FIG. 1 is an enlarged view of a lock mechanism shown together with a lock component in accordance with the invention.

Referring initially to FIG. 1 of the accompanying drawings, a locking mechanism 1 is illustrated which is adapted to be mounted on the chassis of a motor vehicle. A lock component 2 is also illustrated, which is to co-operate with the locking mechanism and which is adapted to be mounted on part of a back-rest of a rear seat within the vehicle. As will become clear, hereinafter, the lock component 2 carries a lockable element which can be retained by the locking mechanism 1.

Figure 2:
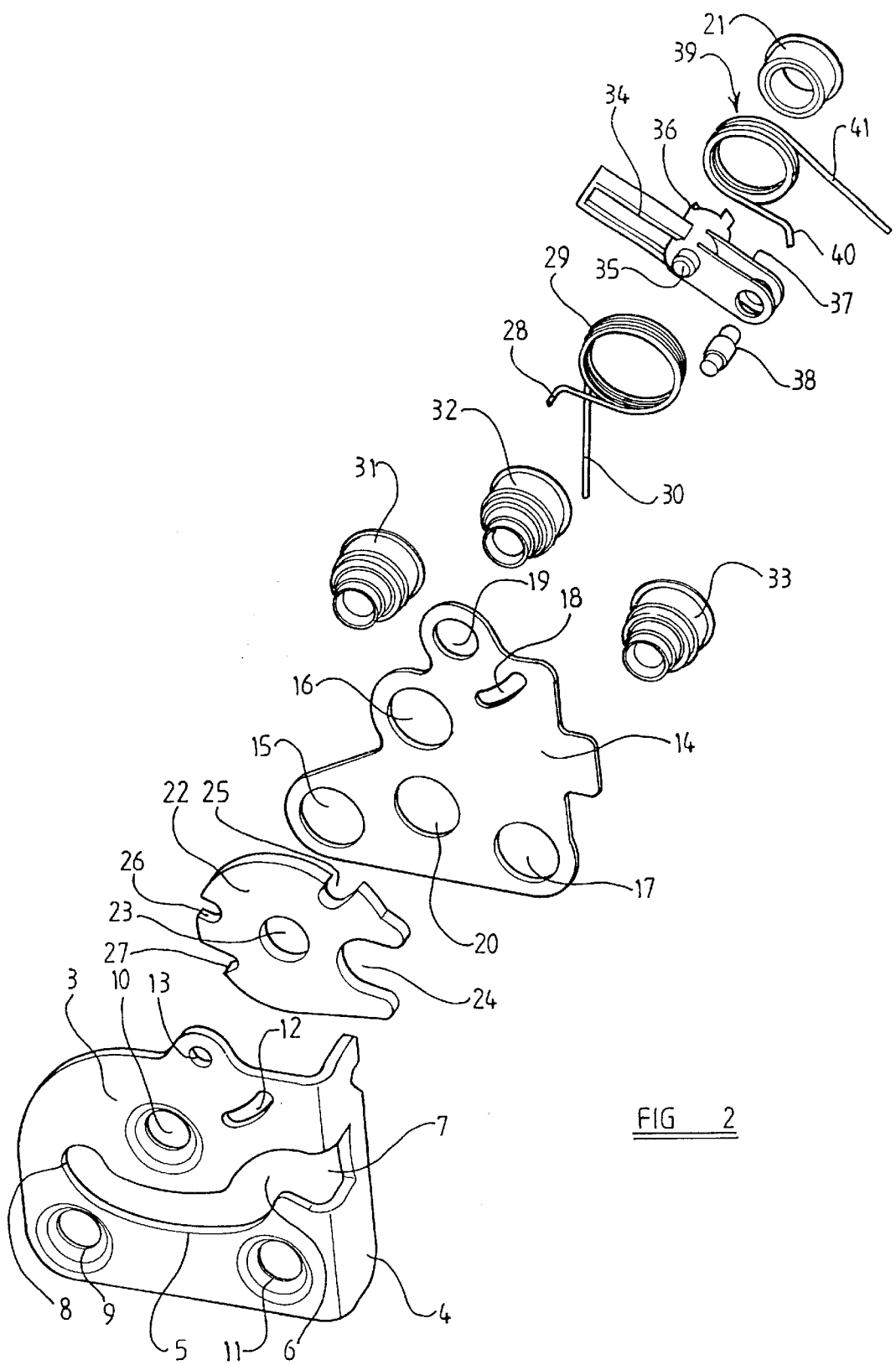
FIG. 2 is an exploded view of the lock mechanism.

Referring now to FIG. 2 of the accompanying drawings, the locking mechanism 1 comprises a front plate 3 carrying, at one vertical edge thereof, a rearwardly extending flange 4. The front plate 3 is provided with an elongate slot 5. The elongate slot 5 has a first portion 6 located adjacent the flange 4 and communicating with a recess 7 which is formed in the flange 4, thus extending transversely of the plane of the front plate 3. The side-walls of the first portion 6 of the slot diverge to form a relatively wide open mouth at the end of the slot. The first portion 6 of the slot 5 is curved, and is curved about a centre of curvature located beneath the slot 5. The slot 5 continues with a generally horizontally extending portion that terminates with an upwardly curved terminal region 8, the terminal region 8 being curved upwardly about a centre of curvature which is located above the slot 5. The front plate 3 is provided with three spaced-apart apertures 9, 10, 11, adapted to receive connecting rivets. The front plate 3 is also provided with a short arcuate slot 12 and a pivot aperture 13.

Co-operating with the front plate 3 is a back plate 14, which is spaced from and parallel with the front plate. The back plate 14 is a planar element, and defines three apertures 15, 16, 17, co-aligned with and corresponding to the apertures 9, 10 and 11 to receive connecting rivets. The back plate 14 is also provided with an arcuate aperture 18 corresponding with and aligned with the slot 12 in the front plate, and is also provided with an aperture 19, which is of greater diameter than, but which is aligned with the pivot aperture 13 provided in the front plate.

The back plate 14 is provided with a further aperture 20 which is substantially centrally located between the three apertures 15, 16, 17 to receive a mounting bush. A mounting bush 21 is provided adapted to be received within the aperture 20, and a lock plate 22 is provided, having a central aperture 23 adapted to be mounted on the bush 21, with the bush 21 passing through the aperture 23 so that the lock plate 22 is rotatable about an axis substantially coincident with the centre of the aperture 20. The forward part of the lock plate 22 is provided with a "U"-shaped recess 24 which is initially aligned with the first part 6 of the slot 5 where the first part 6 of the slot 5 merges into the recess 7 provided in the flange 4, and defines the open mouth. The periphery of the lock member 22 is also provided with two recesses, at spaced-apart positions 25, 26.

The periphery of the lock member 22 is also provided with an abutment 27, the abutment 27 being adapted to engage one end 28 of a helical spring 29 adapted to surround the bush 21. The other end of the spring 29 extends linearly, 30, from the helical portion of the spring, and is adapted to engage one of three rivets 31, 32, 33 provided which pass through the co-aligned apertures 9, 15, 10, 16 and 11, 17 respectively, in order to secure the back plate to the front plate 3. The lock member 22 is thus biased by the spring 29.

Mounted between the front plate and the back plate is an actuating lever 34 which has a first trunion 35 of relatively small diameter passing through the pivot aperture 13, and a second opposed trunion 36 of a relatively large diameter passing through co-aligned aperture 19 formed in the back plate 14. The lever may pivot about the axis defined by the trunions. The lever 34 has a bifurcated end 37, the bifurcated end 37 carrying a transverse rod 38, having end portions which project beyond the bifurcated end. The projecting ends of the rod 38 are received within the arcuate slots 12 and 18. The part of the rod 38 centrally disposed at the bifurcated end 37 of the actuating lever 34 is adapted to be engaged selectively in the recess 25, or in the recess 26 formed in the periphery of the lock plate 22 to retain the lock plate 22 in predetermined positions. The operating lever 34 is associated with a spring 39 having a central helical portion, one projecting end 40 being adapted to engage one end of the rod 38, and another linear projecting end 41 being adapted to engage one of the rivets 33 so that the lever 34 is spring-biased in such a way that the rod 38 is spring-biased into engagement with one of the recesses 25 or 26 of the lock plate 22.

The locking mechanism 1, as described above, is intended to co-operate with the lock component 2 which is shown more clearly in FIGS. 3 to 5. The lock component 2 comprises a generally triangular mounting plate 50 provided with two apertures 51, 52 adapted to receive mounting screws by means of which the plate may be secured in position. The apertures 51 and 52 are formed adjacent two corners of the generally triangular plate 50. A peripheral "U"-shaped recess 53 is formed adjacent the third corner of the plate 50 for a reason that will become clear hereinafter. The central part of the plate 50 is dished upwardly, as shown in FIG. 4, to form a dome-shaped projection 54. An aperture 55 of circular form is provided at the apex of the dome-shaped projection. A flat land may surround the aperture 55.

A resilient intermediate element 56 formed of a yieldable or deformable resilient polymer material such as, for example, polyurethane is provided. The element 56 is provided with a generally planar lower portion 57 adapted to abut the mounting element 50. The planar lower portion may rest on the land surrounding the aperture 55. The element 56 defines an aperture 58 having a diameter which is slightly greater than the diameter of the aperture 55, but which is adapted to be co-aligned therewith. The under-surface of the element 56 is shaped and dimensioned to co-operate with that of the mounting plate 50 which surrounds the aperture 55. The under-part of the element 56 is provided with a projecting cylindrical per 59 dimensioned and located to be received within the recess 53. This will prevent rotation of the element 56 about the axis of the aperture 58.

The upper part of the element 56, as shown in FIG. 4, defines a projecting collar 60 surrounding the aperture 58 and presenting a substantially circular exterior, the collar being provided with a generally "U"-shaped projection 61 which extends radially outwardly from the collar whilst lying in the plane of the collar.

The intermediate element supports a rigid arm 62. One end of the arm 62 comprises a planar portion 63 defining an aperture 64. The periphery of the aperture 64 has a configuration corresponding to the configuration of the periphery of the collar 60, and the "U"-shaped projection 61. The arrangement is such that the aperture 64 may be brought into snug engagement with the collar 60 and the projection 61 to mount the rigid arm on the intermediate element.

The planar portion 63 of the arm 62 is connected by a forwardly cranked portion 65 of the arm to a terminal planar region 66 which is spaced from, but parallel with the planar region 63. The region 66 is provided with an aperture 67 (see FIG. 5).

Mounted within the aperture 67 is a lockable element 68 in the form of a rivet. The rivet 68 comprises a cylindrical shank 69 adapted to be passed through the aperture 67 and peened over to form a rivet head 70 (see FIG. 8). The rivet is provided with an outwardly directed flange 71 adapted to abut the face of the planar portion 66 of the arm 62 remote from the peened over-head 70, and is then provided with a relatively narrow cylindrical portion 72 connecting the flange to an enlarged diameter head 73.

It is to be observed (see FIG. 8) that the upper surface of the flange 71 directed towards the cylindrical portion 72, is chamfered slightly towards the periphery of the flange. The cylindrical portion 72 is slightly barrelled, having a greater diameter at the centre than at each of the opposed ends. The large diameter head 73 has a slightly "domed" upper surface.

A connecting element 74 is provided having a circular head 75 connected to a first cylindrical portion 76 having a diameter equivalent to the interior diameter of the aperture 58 and having a terminal cylindrical portion 77 having a diameter equivalent to the diameter of the aperture 55 provided in mounting plate 50. The connecting element 74 may be mounted in position with the cylindrical portion 76 passing though the aperture 58 provided in the resilient, or yieldable intermediate element 56, and the enlarged head thus overlying the upper part of the collar 60 and also part of the planar portion 63 of the arm 62. The end of the cylindrical portion 77 passing through the aperture 55 in the mounting plate 50 may be peened over to from a rivet head. The rivet head is received within the dome-shaped projection 54.

It is to be appreciated, therefore, that the arm 62 is mounted on the mounting plate 50 via the intermediary of the resilient or deformable element 56. The arm 62 may thus rotate, with a consequent deformation of the resilient or yieldable intermediate element 56, about an axis co-incident with the axis of the connecting element 74, and may also move such that the lockable element 68 moves forwardly and backwardly, along an axis substantially parallel with the axis of the lockable element 68, with a compression and contraction of parts of the yieldable resilient intermediate element 56. Thus, in the described embodiment, the lockable element may move relative to the mounting plate with various degrees of freedom of movement, although such movement is resisted, but not prevented, by the resilient, or yieldable intermediate element 56. As the lockable element 68 moves from an initial or rest position, the intermediate element 56 will apply a bias tending to return it to that initial or rest position.

It is to be appreciated that the locking mechanism 1, as described above, is mounted on the chassis of a motor vehicle, and the lock component 2 is mounted on the back-rest of a rear seat. The lock element may be moved to a first position in which the "U"-shaped recess 24 present in the locking plate 22 is aligned with the open mouth of the channel 6. The back-rest of the seat may then be moved to an elevated position, bringing the lock component 2 towards the locking mechanism 1. The lockable element 68 will then become inserted in the first part 6 of the slot 5. It is to be observed that the open end of the first part 6 of the slot 5, as formed in the front plate 3 of the locking mechanism is diverging, and thus if there is a slight misalignment of the lockable element 68 and the slot 5, the lockable element 68 will be guided into the slot 5. The head 73 of the lockable element engages the recess 24 in the locking element 22, and the relatively and narrow cylindrical portion 72 will be guided into the slot 5. The plate 22 will, as the lockable element 68 is moved further into the slot 5, rotate until the rod 38 carried by the lever 34 is snapped, under the resilient force provided by the spring 39, into the recess 25. The lockable element 68 is thus retained within the locking mechanism 1. However, as the lockable element 68 is being drawn into the slot 6, the lockable element 68 has passed round the curved portion 6 of the slot 5 which has its centre of curvature located beneath the slot 5. The aim 62 will have been moved, thus defining the intermediate element 56, and thus experiences a resilient bias provided by the deformable or yieldable element 56. The bias will therefore be applied to the lockable element 68 forcing the lockable element 68 into firm contact with part of the locking mechanism. Thus the lock will not rattle.

If desired, the lever 34 may be manually operated to remove the rod 38 from the recess 25 in the locking element 22, and the back-rest of the seat may be further adjusted to move the lockable element 68 further along the slot 5 until the lockable element reaches the terminal region 8 of the slot 5. The rod 38 will then be again biased by the spring 39 into the recess 26. The back-rest may, in this way, be locked in a further more reclined position.

By operating the lever 34, the rod 38 may be disengaged from the recess 26, and also from the recess 25 to permit the back-rest to be pivoted forwardly, thus moving the lockable element out of the slot 5 to disengage the lockable element 68 from the locking mechanism 1.

Figure 6:
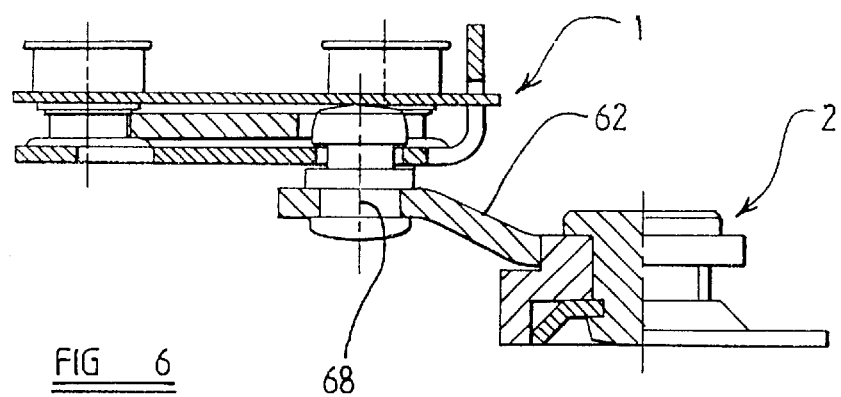
FIG. 6 is a top plan view of the lock component and locking mechanism when engaged.

Referring initially to FIG. 6 of the accompanying drawings it can be seen that the arm 62 is cranked, or bent so that the base of the lockable element 68 that is mounted on the aim is relatively close to the locking mechanism 1. Thus any moment of force which is applied through the lockable element 68 to the arm 62 as the lockable element 68 enters the locking mechanism 1 is relatively low, since the distance between the enlarged diameter head 73, to which any such force will be applied, and the point of connected between the lockable element 68 and the arm 62, where the moment of force will be applied, is relatively short. If the arm 62 was not cranked, the length of the lockable element 68 would be substantially greater, meaning that a greater moment of force would be applied, causing the connection between the lockable element 68 and the arm 62 to have to have a very substantial strength.

Figure 7:
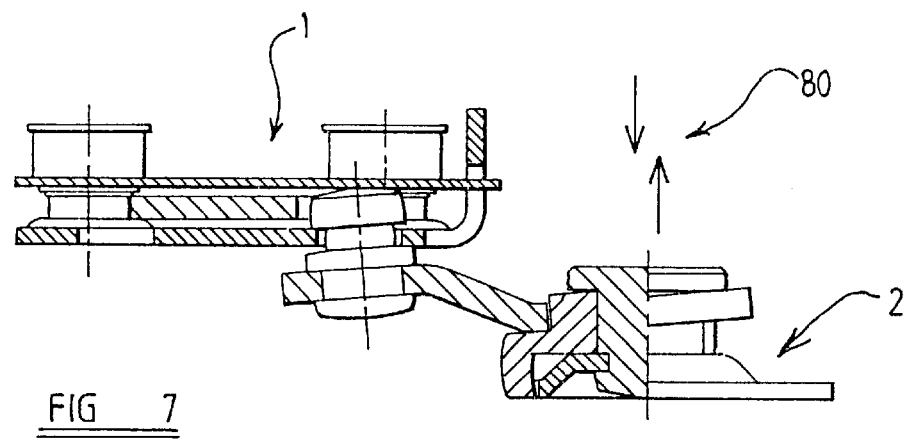
FIG. 7 is a view corresponding to FIG. 6 showing the situation when the lock component is displaced relative to the locking mechanism.
Figure 8:
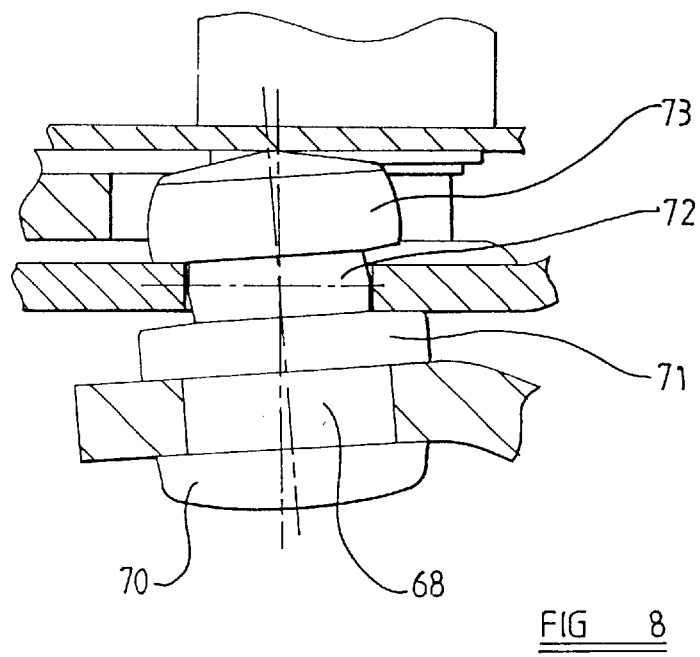
FIG. 8 is an enlarged view of part of FIG. 7.

Referring to FIG. 7 and FIG. 8, it can be seen that if there is any tendency for the mounting plate 50 of the lock component 2 to move inwardly and outwardly relative to the locking mechanism 1, that is to say any tendency for the mounting plate 50 of the lock component 2 to move in the direction indicated by the arrows 80, as shown in FIG. 7, the lockable element 68 may rotate slightly about a notional axis, substantially aligned with the centre of the barrelled cylindrical portion 72, with a simultaneous deformation of the intermediate resilient intermediate element 56.

It can be seen, from FIG. 8, that because the flange 71 has a bevelled upper surface, and because the cylindrical portion has a "barrelled" configuration and because the end of the enlarged diameter head 73 is slightly domed, the lockable element 68 may rotate about a notional axis of rotation co-incident with the centre of the cylindrical portion 72 as the arm 62 deforms the intermediate yieldable resilient element 56. If the lockable element 68 did not have such design features, any movement of the lock component 2 in the direction of the arrow 80 as shown in FIG. 7 might result in permanent damage being effected to the locking mechanism and/or the lock component.

It is to be noted that in embodiments of the invention the arm 62 is mounted relative to the mounting plate 50 by the intermediate resilient element 56. Thus, any movement of the arm 62 is transmitted to the intermediate element 56 which consequently deforms. However, it is to be noted that the connecting element 74 actually passes through the centre of the aperture 64 formed in the arm 62. Thus, even if a very substantial force is applied to the lockable element 68, and that force is transferred to the arm 62, even if the intermediate element 56 does not have sufficient strength to withstand the force and thus collapses or disintegrates, the periphery of the aperture 64 formed in the arm 62 will then be brought into contact with the connecting element 74. The connecting element 74 is thus designed to have substantial strength so that, even if the described lock component 2 is subjected to very severe forces, the component does not totally disintegrate or fail.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A lock component, comprising:
   a mounting plate;
   a deformable element coupled to the mounting plate;
   an arm coupled to the deformable element; and
   a lockable element being coupled to the arm, the lockable element being adapted to co-operate with and be retained by a locking mechanism, the lockable element having two degrees of freedom of movement, one being rotational and one being a lateral displacement.

2. A lock component, comprising:
   a mounting plate;
   a deformable element coupled to the mounting plate;
   an arm coupled to the deformable element and defining an aperture having a predetermined configuration, the aperture being dimensioned to receive a portion of the deformable element, the deformable element having substantially the same configuration as the aperture; and
   a lockable element coupled to the arm, the lockable element being adapted to co-operate with and be retained by a locking mechanism, the lockable element having at least one degree of freedom of movement.

3. The lock component according to claim 2, wherein the deformable element comprises:
   a bore therethrough, the bore being located to be co-aligned with the aperture in the arm when the arm is mounted on the deformable element; and
   connecting means extending through the aperture in the are, through the deformable element, and to the mounting plate.

4. A lock component, comprising:
   a mounting plate;
   a deformable element coupled to the mounting plate;
   an arm coupled to the deformable element; and
   a lockable element coupled to the arm, the lockable element being adapted to co-operate with and the retained by a locking mechanism, the lockable element having at least one degree of freedom of movement, the lockable element comprising an element protruding from said arm, the element comprising:
      a first flange;
      a relatively narrow cylindrical portion; and
      an enlarged diameter head.

5. The lock component according to claim 4, wherein said first flange has a chamfered shape, the relatively narrow cylindrical portion having a barrel shape, and the enlarged diameter head having a substantially domed outward end.

6. A lock assembly, comprising:
   a lock component, comprising
      a mounting plate,
      a deformable element coupled to the mounting plate,
      an arm coupled to the deformable element, and
      a lockable element coupled the arm having at least one degree freedom of movement; and
   a locking mechanism having a front plate defining a slot to receive said lockable element and a rotatable lock plate defining a recess adapted to receive part of the said lockable element, the rotatable lock plate being movable to a position in which the lockable element is retained within the slot, the slot of the locking mechanism and the lock component being arranged such that when the lockable element is inserted into the slot, the deformable element is distorted.

* * * * *